United States Patent Office 3,816,405
Patented June 11, 1974

3,816,405
1α,2α-METHYLENE-ANDROSTANE DERIVATIVES
Arthur Friedrich Marx, 12, Florence Nightingalelaan, Delft, Netherlands
No Drawing. Filed Oct. 18, 1972, Ser. No. 298,512
Claims priority, application Great Britain, Oct. 19, 1971, 48,648/71
Int. Cl. C07c 173/00
U.S. Cl. 260—239.5
31 Claims

ABSTRACT OF THE DISCLOSURE

New 1α,2α-methylene-androstane derivatives of the general formula:

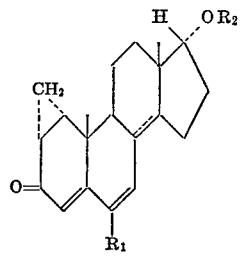

in which the dotted line between the 8- and 14-positions indicates the optional presence of a double bond, and wherein $R_1$ represents a hydrogen or a halogen atom or a methyl group, and $R_2$ represents a hydrogen atom or an acyl group derived from a pharmaceutically acceptable organic carboxylic acid, and processes for the preparation of these new compounds, are disclosed.

These new 1α,2α-methylene-androstane derivatives are therapeutically useful, possessing properties which result in a selective anti-androgenic activity.

---

This invention relates to new therapeutically useful steroids of the androstane series, to processes for their preparation and to pharmaceutical compositions containing them.

The steroids of the present invention are the new 1α,2α-methylene-androstane derivatives of the general formula I

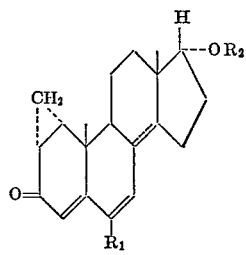

in which the dotted line between the 8- and 14-positions indicates the optional presence of a double bond, and wherein $R_1$ represents a hydrogen or a halogen atom or a methyl group, and
$R_2$ represents a hydrogen atom or an acyl group derived from a pharmaceutically acceptable organic carboxylic acid.

Preferred compounds of the general formula I are those wherein $R_1$ represents a hydrogen, a chlorine or bromine atom or a methyl group, and $R_2$ represents a hydrogen atom or an acyl group derived from an organic carboxylic acid of the general formula $R_3$—COOH, wherein $R_3$ represents a straight or branched chain aliphatic hydrocarbon group having less than 16 carbon atoms and which may be substituted by a halogen atom or a phenyl group, or $R_3$ represents a cycloalkyl group having 3 to 6 carbon atoms, a phenyl, adamantyl or pyridyl group.

The androstane derivatives of the general formula I are therapeutically useful compounds possessing properties which result in a selective anti-androgenic activity. These properties make the compounds useful in the treatment of for example acne, baldness, prostatic hypertrophy and unwanted hair. The compounds can be applied for human as well as veterinary uses; a particular veterinary use is, for example, the treatment of hypersexual activity in animals.

The compounds can be administered orally as well as parenterially; they can also be applied locally, for example on the skin. Specifically preferred are those compounds of the general formula I wherein $R_1$ represents a chlorine atom or a methyl group, and $R_2$ represents a hydrogen atom or an acyl group derived from an organic carboxylic acid of the general formula $R_3'$—COOH, wherein $R_3'$ represents a straight or branched chain aliphatic hydrocarbon group having less than 6 carbon atoms which may be substituted by a chlorine atom or a phenyl group, or $R_3'$ represents a cyclopropyl, phenyl or pyridyl group.

The 1α,2α-methylene-androstane derivatives of the general formula shown in formula I may be prepared by methods known for the preparation of analogous compounds. The terms "methods known per se" and in a "known manner" used hereafter refer to methods heretofore used in this art or described in the chemical literature and therefore known to those skilled in this art.

According to a feature of the invention, the androstane derivatives of formula I are prepared by the process which comprises the introduction of a 1α,2α-methylene group in an androsta-1,4,6-triene derivative of the general formula II

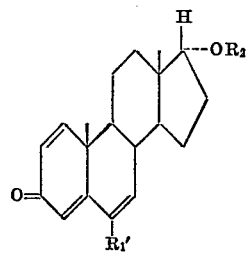

wherein $R_1'$ represents a hydrogen or a halogen atom, and $R_2$ is as hereinbefore defined, by methods known per se. By the term "methods known per se" is meant methods heretofore used or described in the chemical literature.

The conversion of an androsta-1,4,6-triene of formula II to a 1α,2α-methylene-androstane derivative of formula I can be carried out, for example, by means of dimethylsulphoxonium methylide which can be formed in situ by the reaction of trimethylsulphoxonium iodide and sodium hydride. This conversion reaction, involving introduction of the 1α,2α-methylene group, is preferably carried out under anhydrous conditions in an inert organic medium, such as dimethylsulphoxide, at room temperature.

The androsta-1,4,6-triene derivatives of the general formula II, wherein $R_1'$ is a halogen atom are new compounds and as such constitute a feature of the invention. They can be prepared in manner known per se.

A suitable starting material is, for example, 17α-hydroxy-androsta-1,4,6-trien-3-one. This compound can first be converted to the corresponding 6α,7α-epoxy derivative, for example by oxidation with a per-acid, such as m-chloroperbenzoic acid; the reaction is preferably carried out in an inert organic solvent, such as methylene chloride, at room temperature.

The 6α,7α-epoxy derivative can then be acylated by methods known *per se*, for example by reaction with an acid chloride of the formula $R_2'Cl$ or with an anhydride of the formula $(R_2')_2O$, wherein $R_2'$ represents an acyl group derived from a pharmaceutically acceptable organic carboxylic acid. The acylation reaction is preferably carried out in an inert organic medium in the presence of an organic base, such as pyridine.

The resulting 17α-acyloxy-6α,7α-epoxy compound can then be reacted with a hydrogen halide in a suitable organic solvent, e.g. in chloroform, under anhydrous conditions at room temperature, to obtain a corresponding 17α-acyloxy-6-halo androsta-1,4,6-triene derivative of formula II.

The androsta-1,4,6-triene derivatives of the general formula II, wherein $R_1'$ is a hydrogen atom and $R_2$ is as hereinbefore defined can be prepared from 17α-hydroxy-androsta-1,4-dien-3-one. This compound can first be acylated in the manner hereinbefore described to obtain a corresponding 17α-acyloxy derivative, which compound can then be dehydrogenated in the 6–7 position, for example with chloranil or with 2,3-dichloro-5,6-dicyanobenzo-quinone.

The reaction is preferably carried out in an organic solvent having a boiling point between 30° C. and 150° C., for example dioxane B.P. 101° C. or tetrahydrofuran B.P. 65° C., and generally at the boiling point of the solution.

When 2,3-dichloro-5,6-dicyanobenzoquinone is used as dehydrogenating agent, the reaction is carried out in the presence of a strong acid, such as tolulene-*p*-sulphonic acid. To remove remaining impurities the reaction mixture is usually treated with, for example, a solution of sodium methoxide in methanol; when this is done the 17-ester group is then hydrolysed simultaneously and there is obtained 17α-hydroxy-androsta-1,4,6-trien-3-one.

The latter compound can also be prepared by reacting 17α-acyloxy-androsta-1,4-dien-3-one derivative obtained according to the above procedure, with a halogenating agent, for example N-bromosuccinimide. The reaction is preferably carried out by refluxing the compounds in the presence of a peroxide, for example benzoyl peroxide, in an inert organic medium, for example tetrachloromethane.

The resulting 6β-halo-17α-acyloxy-androsta-1,4-dien-3-one derivative can then be converted to a corresponding 17α-acyloxy-androsta-1,4,6-trien-3-one compound by refluxing the 1,4-diene in symm.-collidine under nitrogen. The 17α-acyloxy group can then be hydrolysed in manner known per se, for example by reaction with an alkali metal hydroxide solution in methanol at room temperature, thereby obtaining 17α-hydroxy-androsta-1,4,6-trien-3-one. This compound can then be converted directly to 1α,2α-methylene-17α-hydroxy-androsta-4,6-dien-3-one in the same manner as described hereinbefore for the androsta-1,4,6-triene derivatives of formula II.

Other androsta-1,4,6-triene derivatives of the general formula II, wherein $R_1'$ is a hydrogen atom and $R_2$ is as hereinbefore defined for $R_2'$, are obtained directly according to the above procedure or can be prepared by acylating 17α-hydroxy-androsta-1,4,6-trien-3-one again with an acid chloride of the formula $R_2'Cl$ an anhydride of the formula $(R_2')_2O$ in the manner described hereinbefore.

In a modification of the above processes 1α,2α-methylene-androstane derivatives of the general formula I with a 8(14)-double bond are obtained by converting a 14α-hydroxy-analogue of the androsta-1,4,6-triene derivatives of the general formula II to a corresponding 1α,2α-methylene compound in the same manner as described hereinabove. A resulting 1α,2α-methylene-14α-hydroxy-androsta-4,6-dien-3-one can then be dehydrated to obtain a corresponding 8(14)-dehydro derivative of the formula I.

Preferably, the conversion of the 14α-hydroxy-androsta-1,4,6-triene derivative to a corresponding 1α,2α-methyl-ene compound is carried out with a 14α,17α-phenylborylenedioxy derivative of the formula III

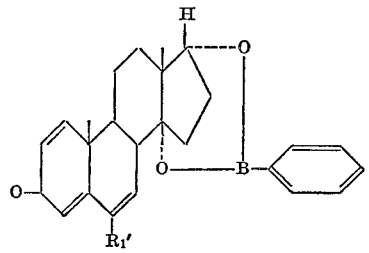

III wherein $R_1'$ is as hereinbefore defined. For example, the 8(14)-dehydro derivatives of the 1α,2α-methylene an-drostanes of formula I, wherein $R_1$ represents a hydrogen atom, can be prepared as follows:

First, the 1α,2α-methylene group can be introduced by reacting 14α,17α - phenylborylenedioxy-androsta - 1,4,6-trien-3-one in the same manner as described hereinbefore for the androsta-1,4,6-triene derivatives of formula II. During this process the phenylborylenedioxy group is hydrolysed simultaneously and there is obtained 1α,2α-methylene-14α,17α-dihydroxy-androsta-4,6-dien-3-one.

This compound can then be acylated to a corresponding 17-acyloxy derivative of the general formula IV

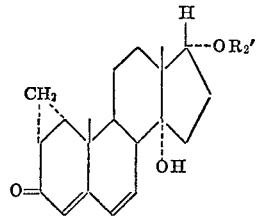

IV wherein $R_2'$ is as hereinbefore defined. Subsequently, a compound of formula IV can be dehydrated to obtain a corresponding 8(14)-dehydro derivative of formula I, this reaction preferably being carried out by refluxing the 17-ester in a suitable organic medium such as dichloroethane, in the presence of a strong acid such as toluene-*p*-sulphonic acid.

The starting material in the above procedure, i.e. 14α, 17α-phenylborylenedioxy-androsta-1,4,6-trien-3-one, can be prepared from 14α,17α,21-trihydroxy-progesterone. First, this compound can be converted into 14α,17α-dihydroxy-androst-4-en-3 - one-17β-carboxylic acid, for example by means of periodic acid at room temperature in a suitable medium, such as pyridine and water. The compound thus obtained can then be reacted with phenylboronic acid, in a suitable organic solvent, such as acetone or tetrahydrofuran, preferably at room temperature, to give 14α,17α-phenylborylenedioxy - androst-4-en-3-one-17β-carboxylic acid.

This compound can then be decarboxylated, for example by heating it in an organic medium with lead tetraacetate under a nitrogen atmosphere, to give 14α,17α-phenylborylenedioxy-androst-4-en-3-one.

This 3-keto compound can then be converted into a corresponding 3-enol ether, for example by reacting the 3-keto compound with an orthoformate of the formula $(R_4O)_3CH$, wherein $R_4$ represents a lower alkyl group.

Preferably this reaction is carried out at room temperature in the presence of a strong acid, such as toluene-*p*-sulphonic acid, as catalyst and, if desired, in an inert organic medium, for example dioxane. A 3-enol ether thus obtained can subsequently be dehydrogenated in the 1,2- and 6,7-positions in similar manner as hereinbefore described, for example with 2,3-dichloro-5,6-dicyano-benzoquinone, to give 14α,17α-phenylborylenedioxy-androsta-1,4,6-trien-3-one.

A 1α,2α-methylene-androstane derivative of the general formula I, wherein $R_1$ is a hydrogen atom and $R_2$ is as hereinbefore defined for $R_2'$, can also be used to obtain other 1α,2α-methylene-androstane derivatives of formula I wherein $R_1$ represents a halogen atom. First, the corresponding 6α,7α-epoxy compound can be prepared in the manner hereinbefore described. A 1α,2α-methylene-6α,7α-epoxy derivative thus obtained can then be reacted with a hydrogen halide to give the corresponding 1α-halomethyl-6-halo-17α-acyloxy-androsta-4,6-dien-3-one of the general formula V wherein

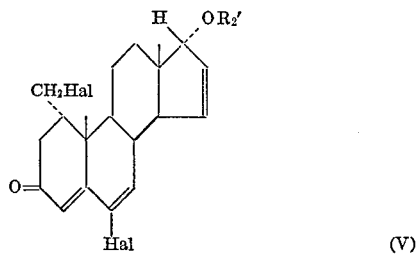

$R_2'$ is as hereinbefore defined and Hal represents a halogen atom. A compound of formula V thus obtained can then be converted to a 1α,2α-methylene-6-halo-17α-acyloxy-androsta-4,6-dien-3-one of the general formula I, for example, by refluxing the compound of formula V in symm.-collidine under nitrogen. With low concentrations of the hydrogen halide in the reaction mixture the 1α,2α-methylene-6α,7α-epoxy derivative is first converted to a corresponding 6β-halo-7α-hydroxy compound. After protection of the 7α-hydroxy group, for example by converting it with mesyl chloride to the 7α-mesyloxy group, the 6β-halo compound can then be converted in similar manner to a 1α,2α-methylene-6-halo-17α-acyloxy-androsta-4,6-dien-3-one of the formula I.

In a modification of this procedure the 6α,7α-epoxy derivative from 1α,2α-methylene-14α,17α-dihydroxy-androsta-4,6-dien-3-one is prepared in the same manner as hereinbefore described and this 6α,7α-epoxy derivative is then acylated in the 17-position.

Subsequently, the 17α-acyloxy derivative thus obtained is reacted with a hydrogen halide; these reactions can be carried out in the same manner as hereinbefore described.

However, during the reaction with hydrogen halide, 8(14)-dehydration is simultaneously effected and thus a 8(14)-dehydro derivative of a compound of general formula V is obtained. This derivative can then be converted to a 1α,2α-methylene-6-halo-8(14)-dehydro-androstane derivative of the formula I, wherein $R_2$ is as hereinbefore defined for $R_2'$ in the same manner as described above.

According to another feature of the invention, the 1α,2α-methylene-androstane derivatives of the general formula I, wherein $R_1$ represents a methyl group and $R_2$ is as hereinbefore defined, which are new compounds and as such constitute a feature of the invention, are prepared from androsta-1,4,6-triene-3,17-dione. In order to protect the 17-keto group during this procedure this compound is preferably first converted to the corresponding 17-ethylene ketal in manner known per se.

Preferably, androsta-1,4-diene-3,17-dione is first converted to the corresponding 17-ethylene ketal; this compound can then be converted to a 6β-halo derivative and subsequently to the corresponding 6,7-dehydro derivative in similar manner as described hereinbefore.

The compound thus obtained, i.e. androsta-1,4,6-triene-3,17-dione 17-ethylene ketal can then be converted to the 1α,2α-methylene derivative and subsequently to the corresponding 6α,7α-epoxy compound. These reactions can be carried out in the same manner as described hereinbefore. Then the 3-keto group of the resulting compound, i.e. 1α,2α - methylene - 6α,7α - epoxy-17,17-ethylenedioxy-andro-4-en-3-one, has to be protected too, for example by conversion with O-methylhydroxylamine to the 3-methoximino group.

By this reaction there is obtained a mixture of the syn- and anti-isomers of the 3-methoximino compound. The isomers can be separated by column chromatography and thus each be identified. This separation is not necessary however, for the following reactions which can be carried out with each of the isomers separately, but also with the mixture of the isomers obtained by the preceding reaction as such.

The resulting compound: 1α,2α-methylene-3-methoximino-6α,7α-epoxy - 17,17 - ethylenedioxy-androst-4-one (mixture of syn- and anti-isomers) can then be reacted with a suitable methylating agent, for example, a Grignard reagent of the formula $CH_3MgHal$, wherein Hal represents a halogen, preferably bromine atom. After hydrolysis there is obtained 1α,2α-methylene-3-methoximino - 6β - methyl-7α-hydroxy-androst-4-en-17-one (mixture of syn- and anti-isomers).

The resulting 1α,2α-methylene-6β-methyl-androst-4-en-17-one derivative can then be converted to the desired compound 1α,2α-methylene-6-methyl-17α-hydroxy-androsta-4,6-dien-3-one and its 17α-acyloxy derivatives of the general formula I, in manner known per se.

First, the 6–7 position can be dehydrated, preferably by converting the 7α-hydroxy group to a 7α-mesyloxy group with mesylchloride, followed by refluxing the resulting 7α-mesyloxy derivative in a suitable organic medium, such as N,N-dimethylaniline. Then the 3-methoximino group in the obtained 6,7-dehydro compound (mixture of syn- and anti-isomers) can be hydrolysed with for example semicarbazide hydrochloride; this reaction is preferably carried out by refluxing the reactants in a suitable organic solvent, such as ethanol, with some water. There is obtained 1α,2α-methylene-6-methyl-androsta-4,6-diene-3,17-dione, but also some of the 17-methoximino derivative as an undesired by-product.

Upon reduction of the 3,17-diketone, for example with sodium borohydride, in a suitable organic medium, such as methanol, at temperatures preferably below 0° C., the corresponding 17β-hydroxy derivative, i.e. 1α,2α-methylene-6-methyl-17β-hydroxy-androsta-4,6-diene-3-one, is obtained. This 17β-hydroxy compound can then be converted to the corresponding 17α-derivative in manner known per se.

First the 17β-hydroxy group is converted to the 17β-mesyloxy group by reaction with mesylchloride, and the 17β-mesyloxy derivative is then heated in an inert organic medium, for example N-methylpyrrolidone, in the presence of an alkali metal carbonate. There is obtained a compound of formula I, wherein $R_1$ represents a methyl group and $R_2$ is a hydrogen atom, viz. 1α,2α-methylene-6-methyl-17α-hydroxy-androsta-4,6-dien-3-one.

A 1α,2α-methylene-17α-hydroxy-androstane derivative of the general formula I, obtained according to one of the procedures described hereinbefore, can be converted to a corresponding 17α-acyloxy derivative by reaction with an appropriate acid chloride of the formula $R_2'Cl$ or with an anhydride of the formula $(R_2')_2O$, wherein $R_2'$ is as hereinbefore defined, in the manner described hereinabove. Thus there is obtained another 1α,2α-methylene-androstane derivative of the general formula I.

On the other hand, a 1α,2α-methylene-17α-acyloxy-androstane derivative of the formula I, obtained according to one of the procedures described hereinbefore, can be hydrolysed in known manner to obtain a corresponding 1α,2α-methylene-17α-hydroxy-androstane derivative of formula I. The following Examples illustrate the preparation of the new steroids of the androstane series of the present invention.

EXAMPLE I a. 1 g. of 17α-hydroxy-androsta-1,4-dien-3-one was acetylated in 4 ml. of pyridine and 2 ml. of acetic anhydride for 16 hours at room temperature. There was obtained 1.0 g. of 17α-acetoxy-androsta-1,4-dien-3-one, M.P. 112°–113° C. (heptane).

I.R. (CHCl$_3$): 1720, 1660, 1620, 1601, 1250 cm.$^{-1}$.
M.S.: mol. peak 328.

b. A mixture of 1.1 g. of the product of (a), 1.0 g. of 2,3-dichloro-5,6-dicyano benzoquinone, 5 ml. of dioxane and 10 mg. of toluene-p-sulphonic acid was refluxed with stirring for 72 hours. Next the reaction mixture was cooled to a temperature below 5° C. and 3 ml. of methylene chloride were added. The crystallized 2,3-dichloro-5,6-dicyanohydroquinone was removed by filtration and the filtrate evaporated to dryness. The residue was dissolved in 10 ml. of methyl isobutyl ketone and the solution was washed several times with dilute sodium hydroxide solution. The organic layer was evaporated and the residue was hydrolysed in 10 ml. of 1 N sodium methoxide in methanol. Hydrolysis was complete after 16 hours as shown by thin layer chromatography. The solution was neutralized with acetic acid and evaporated to dryness. The residue was recrystallized, first from acetone and then from ethyl acetate-ethanol, yielding 0.32 g. of 17α-hydroxy-androsta-1,4,6-trien-3-one, M.P. 228°–231° C.

I.R. (CHCl$_3$): 3613, 1658, 1648, 1628, 1601, 1580 cm.$^{-1}$.
M.S.: mol. peak 284.

c. The product of (b) was acetylated in a mixture of 2.5 ml. of pyridine and 1.2 ml. of acetic anhydride at room temperature. After 1.5 hours the organic solvents were removed by distillation, the oily residue was dissolved in 5 ml. of methyl isobutyl ketone and the solution was washed successively with 6 N sulphuric acid, water, 1 N sodium carbonate solution and water. Evaporation of the solvent yielded 0.33 g. of 17α-acetoxy-androsta-1,4,6-trien-3-one as an oil.

d. To a solution of 6 g. of trimethylsulphoxonium iodide in 55 ml. of anhydrous dimethylsulphoxide, stirred at room temperature under nitrogen, 1.3 g. of sodium hydride (50% suspension in mineral oil) were added in small portions. When the hydrogen formation ceased, 3.6 g. of the product of (c) (dissolved in 11 ml. of dimethylsulphoxide) were added. After 1 hour the reaction mixture was poured into a stirred mixture of 150 ml. of water, 5 ml. of 6 N sulphuric acid and 150 ml. of methyl isobutyl ketone. The organic layer was separated and the aqueous layer extracted twice with methyl isobutyl ketone. The combined extracts were washed with water and the solvent was then removed under reduced pressure. The residue was dissolved in 12.5 ml. of pyridine and 6.3 ml. of acetic anhydride and kept at 50° C. for 2.5 hours. After that the solvents were removed by distillation and the residue was dissolved in methyl isobutyl ketone. The solution was washed successively with dilute sulphuric acid, water, sodium carbonate solution and water and next evaporated to dryness. The oily residue was crystallized from heptane yielding 3.0 g. of crude 1α,2α-methylene-17α-acetoxy-androsta-4,6-dien-3-one.

Recrystallization from diethyl ether-heptane and acetone-water respectively yielded 1.6 g. of product melting at 127°–128° C.

I.R. (CHCl$_3$): 1718, 1642, 1620, 1582, 1371 cm.$^{-1}$.
M.S.: mol. peak 340.

EXAMPLE II a. A mixture of 3.3 g. of 17α-acetoxy-androsta-1,4-dien-3-one, 2.2 g. of N-bromosuccinimide and 0.1 g. of benzoyl peroxide in 30 ml. of tetrachloromethane was refluxed for 1.5 hours and then cooled to room temperature. The crystallized succinimide was filtered off and washed with tetrachloromethane. The filtrate was evaporated to dryness and the residue purified by chromatography. The yield was 2.2 g. of pure 6β-bromo-17α-acetoxy-androsta-1,4-dien-3-one, M.P. 127°–129° C.

U.V. (CH$_3$OH): 250.5 nm.; ε=17,000.

b. A mixture of 5.3 g. of the product of (a) and 18.5 ml. symm.-collidine was refluxed under nitrogen. After 3 hours the reaction was complete and the collidine was removed by distillation under reduced pressure.

The residue was dissolved in methyl isobutyl ketone and the solution washed successively with water, dilute hydrochloric acid and water. Next the organic solvent was evaporated and the residue dissolved in 52 ml. of methanol; 0.5 g. of potassium hydroxide were added and the resulting solution was set aside at room temperature.

Saponification was complete after 16 hours and after addition of 0.5 ml. of acetic acid the reaction mixture was evaporated to dryness.

The residue was crystallized from methanol yielding 3.2 g. of pure 17α-hydroxy-androsta-1,4,6-trien-3-one, M.P. 229°–231° C. The product proved to be identical with the product of I(b).

c. To a solution of 2.75 g. of trimethylsulphoxonium iodide in 25 ml. of anhydrous dimethylsulphoxide, stirred at room temperature under nitrogen, 0.50 g. of sodium hydride (50% suspension in mineral oil) were added. When the hydrogen formation ceased, 1.42 g. of the product of (b) were added. After 1 hour of stirring the reaction mixture was poured into 250 ml. of water. The crystalline product was filtered off, washed with water and dried. After crystallization from methylene chloride/heptane there were obtained 2.20 g. of 1α,2α-methylene-17α-hydroxy-androsta-4,6-dien-3-one, M.P. 179°–181° C.

I.R. (CHCl$_3$):3612, 1642, 1620, 1587 cm.$^{-1}$.

EXAMPLE III a. A solution of 13 g. of 1α,2α-methylene-17α-acetoxy-androsta-4,6-dien-3-one and 26 g. of m-chloroperbenzoic acid in 260 ml. of methylene chloride was left at room temperature. After 22 hours the crystallized m-chlorobenzoic acid was filtered off and washed with methylene chloride. To the combined filtrate and washings a 50% aqueous sodium bisulphite solution was added drop-wise with stirring and cooling until all the peroxide had been decomposed.

More crystalized m-chlorobenzoic acid was removed by filtration. The filtrate was washed three times with 2 N sodium hydroxide, dilute acetic acid and water.

The organic solvent was evaporated in vacuo and the residue crystallized from diethyl ether. The yield was 5.6 g. of 1α,2α-methylene-6α,7α-epoxy-17α-acetoxy-androst-4-en-3-one melting at 204°–206° C.

I.R. (CHCl$_3$): 1720, 1659, 1623, 1370, 1020, 859 cm.$^{-1}$.
M.S.: mol. peak 356.

b. 6.9 g. of the product of (a) were dissolved in 690 ml. of chloroform, saturated with hydrogen chloride and the solution was left at room temperature. After 4 hours the solution was washed successively with water, aqueous sodium bicarbonate and water. The chloroform was evaporated and the residue dissolved in 25 ml. of pyridine and 12.5 ml. of acetic anhydride and the solution kept at 50° C. for 2 hours. The organic solvents were then removed by distillation under reduced pressure and the oily residue was triturated with water after which the product crystallized. 8.3 g. of crude 1α-chloromethyl-6-chloro-17α-acetoxy-androsta-4,6-dien-3-one were obtained. 200 mg. were purified by chromatography on a silica gel column (elution with benzene-2% acetone), yielding the pure compound melting at 138.5°–139° C.

I.R. (CHCl$_3$): 1728, 1660, 1600, 1572, 1371, 1028 cm.$^{-1}$.
M.S.: mol. peak 410.

c. 8 g. of the crude product of (b) were dissolved in 400 ml. of symm.-collidine (distilled over potassium hydroxide pellets). The solution was saturated with nitrogen and heated to reflux. After refluxing for 2 hours the reaction mixture was cooled and poured into cold dilute hydrochloric acid (5%).

The resulting compound was extracted with methyl isobutyl ketone and the extract washed with water and concentrated. The residue was dissolved in 32 ml. of pyridine and 16 ml. of acetic anhydride and the solution left at room temperature. After 16 hours the solvents were removed in vacuo and the residue was purified by column chromatography ($SiO_2$; benzene-2% acetone). There was obtained 3.2 g. of $1\alpha,2\alpha$-methylene-6-chloro-$17\alpha$-acetoxy-androsta-4,6-dien-3-one, M.P. 122.5°–123.5° C. (diethyl ether).

I.R. ($CHCl_3$): 1720, 1650, 1603, 1585, 1023 cm.$^{-1}$.
M.S.: mol. peak 374.
N.M.R. ($CDCl_3$): 0.84, 1.21, 2.02, 4.82, 6.14, 6/.21 p.p.m.
U.V. ($CH_3OH$): 282 nm.; $\epsilon$=17,000.

EXAMPLE IV a. A mixture of 25 ml. of dioxane, 2.5 ml. of triethylorthoformate and 123 mg. of toluene-p-sulphonic acid was stirred for half an hour at room temperature. 2.5 g. of $14\alpha,17\alpha$-phenylborylenedioxy-androst-4-en-3-one and 1.9 ml. of triethylorthoformate were then added. After 8 hours stirring at room temperature, the reaction was complete, as shown by thin layer chromatography, and the mixture was neutralized by the addition of 0.5 ml. of pyridine. The organic solvents were removed by distillation under reduced pressure, the residue was dissolved in methyl isobutyl ketone and washed with water. The solvent was then evaporated and the residue crystallized from ethanol (96%).

Recrystallization from ethanol (96%) yielded 1.7 g. of pure 3-ethoxy-$14\alpha,17\alpha$-phenylborylenedioxy - androsta-3,5-diene, melting at 124°–127° C.

I.R. ($CHCl_3$): 1650, 1620, 1599, 1435, 1329, 1170 cm.$^{-1}$.
M.S.: mol. peak 418.

b. A solution of 1.8 g. of 2,3 - dichloro - 5,6 - dicyanobenzoquinone in 36 ml. of dioxane was added over 15 minutes to a stirred solution of 1.5 g. of the product of (a) in 14 ml. of dioxane. After a total reaction time of 45 minutes the crystallized 2,3-dichloro-5,6-dicyanohydroquinone was filtered off and washed with methylene chloride. The filtrate and washing were combined and the solvent evaporated in vacuo. The residue was dissolved in methylene chloride and filtered over a short column containing 10 g. of alumina (Woelm; neutral; inactivated by 0.3 ml. of 10% acetic acid). The filtrate was evaporated and the residue was crystallized from ethanol yielding 0.6 g. of $14\alpha,17\alpha$-phenylborylenedioxy-androsta-1,4,6 - trien-3-one. Recrystallization from acetone yielded a product melting at 241°–243° C.

I.R. ($CHCl_3$): 1650, 1603, 1581, 1322, 1100 cm.$^{-1}$.
M.S.: mol. peak 386.

c. To a solution of 6 g. of trimethylsulphoxonium iodide in 110 ml. of anhydrous dimethylsulphoxide, stirred at room temperature and under nitrogen, 1.3 g. of sodium hydride (50% suspension in mineral oil) were added in portions. When the hydrogen evolution had ceased, 4.3 g. of the product of (b) were added. After three hours the reaction mixture was poured into ice-water and the product extracted with methyl isobutyl ketone. The extract was concentrated in vacuo to an oil which was refluxed in a mixture of 110 ml. of acetone and 110 ml. of 5 N potassium hydroxide.

After 30 minutes hydrolysis was complete (according to thin layer chromatography). The organic layer was separated and concentrated until crystallization of the product. The crystals were collected on a glass filter, washed with water and dried. Recrystallization from acetone yielded 2.2 g. of pure $1\alpha,2\alpha$-methylene-$14\alpha,17\alpha$-dihydroxy-androsta-4,6-dien-3-one, M.P. 234°–236° C.

I.R. ($CHCl_3$): 3595, 3490, 1645, 1622, 1587 cm.$^{-1}$.
M.S.: mol. peak 314.

d. A mixture of 0.7 g. of the product of (c), 3.0 ml. of pyridine and 1.5 ml. of acetic anhydride was kept at 90° C. for 3.25 hours.

The reaction mixture was then concentrated under reduced pressure and the residue dissolved in methyl isobutyl ketone. The solution was washed successively with dilute sulphuric acid, water, sodium carbonate solution and water.

After removing the organic solvent, 0.8 g. of $1\alpha,2\alpha$-methylene-$14\alpha,17\alpha$-dihydroxy-androsta-4,6-dien - 3 - one 17 acetate was obtained as an oil.

I.R. ($CHCl_3$): 3580, 1733, 1645, 1622, 1583, 1371, 1025 cm.$^{-1}$.
M.S.: mol. peak 356.

e. 0.87 g. of the product of (d) in 16 ml. of dichloroethane were refluxed with 400 mg. of toluene-p-sulphonic acid for 2 hours. After cooling to room temperature, the resulting solution was washed with sodium carbonate solution and then with water. The solvent was then removed by distillation and the residue crystallized from acetone. The yield was 0.35 g. of crude $1\alpha,2\alpha$-methylene-$17\alpha$-acetoxy-androsta-4,6,8(14)-trien-3 - one. Recrystallization from cyclohexane and then acetone yielded 2.5 g. of pure product melting at 146.5°–148° C.

I.R. ($CHCl_3$): 1720, 1640, 1591, 1565, 1370, 1048 cm.$^{-1}$.
M.S.: mol. peak 338.

EXAMPLE V a. Following the procedure described in Example III (a) 24 g. of $1\alpha,2\alpha$-methylene-$14\alpha,17\alpha$-dihydroxy-androsta-4,6-dien-3-one were transformed into 8.7 g. of $1\alpha,2\alpha$-methylene - $6\alpha,7\alpha$ - epoxy - $14\alpha,17\alpha$ - dihydroxy-androst-4-en-3-one melting at 199°–203° C. (diethyl ether).

I.R. ($CHCl_3$): 3589, 3520, 1668, 1630, 979, 858 cm.$^{-1}$.

b. A solution of 8.7 g. of the product of (a) in 35 ml. of pyridine and 17.5 ml. of acetic anhydride was heated to 50° C. After 30 hours at that temperatupre the reaction mixture was evaporated in vacuo and the residue purified by chromatography on a silica gel column (elution with toluene+10% acetone). The yield was 9.0 g. of amorphous $1\alpha,2\alpha$-methylene - $6\alpha,7\alpha$ - epoxy-$14\alpha$-hydroxy-$17\alpha$-acetoxy-androst-4-en-3-one.

I.R. ($CHCl_3$): 3575, 1735, 1660, 1630, 1372, 1028 cm.$^{-1}$.
M.S.: mol. peak 372.

c. 0.9 g. of the product of (b) were dissolved in 90 ml. of chloroform saturated with hydrogen chloride and the resulting solution was left at room temperature. After 22 hours the solution was washed successively with water, aqueous sodium bicarbonate solution and water, and then evaporated to dryness. The oily residue was dissolved in benzene and chromatographed on a silica gel column (elution with benzene-2% acetone). The pure product was dissolved in methanol and precipitated by the addition of water, filtered off and dried.

The yield was 0.35 g. of amorphous $1\alpha$-chloromethyl-6-chloro-$17\alpha$-acetoxy-androsta-4,6,8(14)-trien-3-one.

I.R. ($CHCl_3$): 1730, 1660, 1578, 1370 cm.$^{-1}$.
M.S.: mol. peak 408.

d. A solution of 200 mg. of the product of (c) in 10 ml. of anhydrous symm.-collidine was refluxed under nitrogen for 1.5 hours. After cooling to room temperature, the mixture was poured into cold 5% aqueous hydrochloric acid. The steroid was extracted with methyl isobutyl ketone; the extract was washed with 5% aqueous hydrochloric acid and then with water until it was neutral. The organic solvent was removed by distillation under reduced pressure and the residue purified by column chromatography. Crystallization from diethyl ether yielded 60 mg. of pure 1α,2α-methylene-6-chloro-17α-acetoxy-androsta-4,6,8(14)-trien-3-one, melting at 159°–160° C.

I.R. (CHCl₃): 1728, 1660, 1642, 1585, 1370 cm.⁻¹.
M.S.: mol. peak 372.

EXAMPLE VI a. A mixture of 9.8 g. of androsta-1,4-diene-3,17-dione 17-ethylene ketal, 6.7 g. of N-bromosuccinimide and 0.4 g. of benzoyl peroxide was refluxed in tetrachloro methane. After 0.5 hour the reaction mixture was cooled to room temperature and the crystallized succinimide was filtered off and washed with tetrachloromethane. The filtrate was evaporated in vacuo and the residue crystallized from methyl isobutyl ketone. The yield was 6.6 g. of 6β-bromoandrosta-1,4-diene-3,17-dione 17-ethylene ketal; M.P. 174°–175.5° C.

I.R. (CHCl₃): 1661, 1620, 1600, 1107, 1038, 894 cm.⁻¹.
M.S.: mol. peak 406–408 (⁷⁹Br and ⁸¹Br).

b. A suspension of 5.8 g. of the product of (a) in 23 ml. of symm.-collidine was saturated with nitrogen and then refluxed for 0.5 hour. After cooling to room temperature the reaction mixture was diluted with methyl isobutyl ketone and washed three times with water. The organic layer is then evaporated to dryness under reduced pressure. The residue is dissolved in 75 ml. of diethyl ether, treated with 1 g. of coal and concentrated. The crystallized steroid was collected, washed with diethyl ether and dried. The yield was 2.9 g. of androsta-1,4,6-triene-3,17-dione 17-ethylene ketal, M.P. 128°–130° C.

I.R. (CHCl₃): 1650, 1624, 1601, 1580, 1114 cm.⁻¹.
M.S.: mol. peak 326.

(c) To a solution of 6.2 g. of trimethylsulphoxonium iodide in 56 ml. of anhydrous dimethylsulphoxide, saturated with nitrogen, 1.3 g. of sodium hydride (50% suspension in mineral oil) were added in small portions. After the hydrogen development had ceased a solution of 3.6 g. of the product of (b) in 33.5 ml. of dimethylsulphoxide was added. According to the U.V.-spectrum (displacement of maximum from 300 nm. to 283 nm.) the reaction was complete within 0.5 hour. The reaction mixture was poured into 1.5 l. of water and extracted with methyl isobutyl ketone. The extract was washed well with water and evaporated to dryness. The oily residue upon crystallization from diethyl ether yielded 3.4 g. of 1α,2α-methylene-17,17-ethylenedioxy-androsta-4,6-dien-3-one, M.P. 151°–152.5° C.

I.R. (CHCl₃): 1641, 1620, 1584, 1107, 1038 cm.⁻¹.
N.M.R. (CDCl₃): 0.9, 0.93, 1.16, 3.35, 3.87, 5.90 p.p.m.

d. A solution of 3.0 g. of the product of (c) and 3.0 g. of m-chloroperbenzoic acid in 60 ml. of methylene chloride was set aside at room temperature. After 18 hours excess peroxide was destroyed by the addition of a 50% aqueous sodium bisulphite solution.

The organic layer was separated and washed successively with water, sodium hydroxide solution and water. The solvent was then evaporated and the residue crystallized from methanol. The yield was 1.7 g. of 1α,2α-methylene-6α,7α-epoxy-17,17-ethylenedioxy-androst-4-en-3-one, M.P. 239°–242° C.

I.R. (CHCl₃): 1658, 1603, 1572, 1370, 1099 cm.⁻¹.
N.M.R. (CDCl₃): 0.9, 0.93, 1.16, 3.35, 3.87, 5.90 p.p.m.

e. To a solution of 1.4 g. of the product of (d) in 8 ml. of chloroform and 10 ml. of methanol was added a solution of 1.3 g. of O-methylhydroxylamine hydrochloride and 1.3 g. of sodium acetate in 4 ml. of water and 4 ml. of methanol and the mixture stirred at room temperature. After 1.5 hours the reaction mixture was diluted with 100 ml. of chloroform and washed well with water. The solvent was evaporated and the residue crystallized from diethyl ether. The yield was 1.1 g. of pure 1α,2α-methylene-3-methoximino-6α,7α-epoxy-17,17-ethylenedioxy-androst-4-ene (mixture of syn- and anti-isomers).

200 mg. of this mixture was separated by means of a silica gel column (elution with benzene+3% acetone) yielding: 93 mg. of the syn-isomer.

U.V. (CH₃OH): 233.5 nm.; ε=11,000 and 272 nm.; ε=12,600 and 23 mg. of the anti-isomer.
U.V. (CH₃OH): 257.5 nm.; ε=19,500.

f. A Grignard reagent was prepared from 48 mg. of Mg powder and 0.14 ml. of methyl iodide in 3 ml. of anhydrous tetrahydrofuran. To this reagent was added a solution of 356 mg. of the product of (e) (mixture of syn- and anti-isomers) in 3.5 ml. of tetrahydrofuran and the resulting mixture refluxed. After 14 hours the transformation was complete. The reaction mixture was cooled to room temperature and 5 ml. of 1 N hydrochloric acid were added. Stirring was continued for an additional 5 hours at room temperature, after which the mixture was poured into water.

The product was extracted with methyl isobutyl ketone and the extract washed with aqueous sodium bicarbonate solution and with water. The extract was then evaporated to dryness and the residue purified by means of column chromatography. There was obtained: 5 mg. of pure 1α,2α-methylene-3-syn-methoximino-6β-methyl-7α-hydroxy-androst-4-en-17-one.

I.R. (CHCl₃): 3615, 2822, 1730, 1623, 1579, 890, 878, cm.⁻¹, and 16 mg. of pure 1α,2α-methylene-3-anti-methoximino-6β-methyl-7α-hydroxyandrost-4-en-3-one.

I.R. (CHCl₃): 3610, 2824, 1733, 1530, 1590, 1049, 901 cm.⁻¹.

g. To a solution of 2.32 g. of the product of (f) (syn-isomer) in 65 ml. of pyridine, 13 ml. of mesyl chloride were added dropwise with stirring and cooling. After the addition the mixture was stirred for 5 hours at room temperature, and then poured into water (0.75 l.). The crystalline precipitate was filtered off and washed with water and dried. The yield was 2.54 g. of crude product. Crystallization from methanol yielded 2.2 g. of pure 1α,2α-methylene-3-syn-methoximino-6β-methyl-7α-mesyloxy-androst-4-en-17-one.

I.R. (CHCl₃): 3615, 2822, 1730, 1623, 1579, 890, 878 cm.⁻¹, and

N.M.R. (CDCl₃): 0.55, 0.94, 1.30, 1.34, 3.00, 3.90, 4.8, 6.3 p.p.m.

Repeating this experiment with 11.1 g. of a mixture of the syn- and anti-isomers yielded 9.5 g. of the mesylate (mixture of syn- and anti-isomers) as an oil.

h. A solution of 1.95 g. of the product of (g) (syn-isomers) in 97.5 ml. of N,N-dimethylaniline was refluxed for 1 hour under nitrogen. The mixture was then cooled to room temperature and poured into 5% hydrochloric acid. The product was extracted with methyl isobutyl ketone, the extract was washed with water and then evaporated to dryness. The residue was dissolved in diethyl ether, treated with coal, filtered and the filtrate concentrated. The crystallized product was collected and recrystallized from ethanol. The yield was 0.36 g. of pure 1α,2α-methylene-3-syn-methoximino-6-methyl-androsta-4,6-dien-17-one.

I.R. (CHCl₃): 2821, 1735, 1601, 1050, 898, 876 cm.⁻¹.
N.M.R. (CDCl₃): 0.5, 0.97, 1.11, 1.9, 3.92, 5.85, 6.37 p.p.m.

Repetition of this experiment with 9.5 g. of a mixture of the syn- and anti-isomers yielded 6.7 g. of the diene (syn- and anti-mixture).

i. A mixture of 0.34 g. of the product of (h) (syn-isomer), 34 ml. of ethanol, 1.1 g. of semicarbazide hydrochloride and 3.4 ml. of water was refluxed under nitrogen. After 4 hours the transformation was complete and the mixture was cooled in an ice bath. The crystallized excess semicarbazide hydrochloride was filtered off and washed with cold ethanol. To the filtrate were added 10 ml. of 1 N sodium bicarbonate solution and the mixture was evaporated to dryness. The residue was dissolved in chloroform and the solution washed with water and again evaporated to dryness. This residue was refluxed in 50% acetic acid under nitrogen. After 6 hours refluxing the reaction mixture was poured into water and extracted with methyl isobutyl ketone. The extract was washed successively with 5% hydrochloric acid, aqueous sodium bicarbonate solution and water and then evaporated to dryness. The residue was purified on a silica gel column. After crystallization from diethyl ether the following products were isolated: 20 mg. of the starting material, 18 mg. of pure 1α,2α-methylene-6-methyl-17-methoximino-androsta-4,6-dien-3-one, M.P. 147°–149° C.; and 65 mg. of 1α,2α-methylene-6-methyl-androsta-4,6-diene-3,17-dione, M.P. 280°–285° C.

I.R. (CHCl$_3$): 1736, 1642, 1625, 1582, 1372 cm.$^{-1}$.
N.M.R. (CDCl$_3$): 0.98, 1.20, 1.86, 5.72, 5.94 p.p.m.

This experiment was repeated with 6.8 g. of a mixture of the syn- and anti-isomers. After column chromatography and recycling of recovered starting material there were obtained: 1.27 g. of the 17-methoximino-derivative and 1.63 g. of pure 1α,2α-methylene-6-methyl-androsta-4,6-dien-3,17-dione.

j. To a suspension of 1.6 g. of the 3,17-dione in 32 ml. of methanol, cooled to −5° C., 196 mg. of NaBH$_4$ were added in such a way that the temperature did not rise above 0° C. After 3 hours an additional 75 mg. of NaHB$_4$ were added. After 5 hours the reaction was complete and the mixture was poured into 8 ml. of 10% acetic acid. The product was extracted with methyl isobutyl ketone, the extract was washed with water and evaporated to dryness. The residue was purified by column chromatography and the product crystallized from diethyl ether. The yield was 1.03 g. of 1α,2α-methylene-6-methyl-17β-hydroxy-androsta-4,6-dien-3-one, M.P. 179.5–180.5° C.

I.R. (CHCl$_3$): 3612, 1643, 1622, 1582, 1370 cm.$^{-1}$.

k. To a cooled solution of 0.99 g. of the product of (j) in 20 ml. of anhydrous pyridine, 2 ml. of mesyl chloride were added with stirring. After 1 hour excess mesyl chloride was decomposed by the addition of ice flakes. Next the mixture was poured into water and the product extracted with methyl isobutyl ketone. The extract was washed with water, dilute hydrochloric acid and water and then evaporated to dryness. The yield was 1.24 g. of oily 17β-mesylate.

I.R. (CHCl$_3$): 1645, 1626, 1585, 1355, 1170 cm.$^{-1}$.

l. A mixture of 1.24 g. of the 17β-mesylate, 1.24 g. of potassium acetate and 10 ml. of N-methylpyrrolidone was heated to 160° C. under nitrogen with stirring. After 16 hours ¼ of starting material was still left and the temperature was raised to 200° C. Stirring was continued for 5 hours after which the transformation was complete. The reaction mixture was cooled, poured into water and the product extracted with methyl isobutyl ketone. The extract was washed successively with 5% hydrochloric acid, dilute aqueous sodium bicarbonate solution and water, and evaporated to dryness. The residue was dissolved in 10 ml. of methanol and to this solution 0.2 g. of potassium hydroxide were added. After 16 hours hydrolysis was complete; 0.25 ml. of acetic acid were added and the mixture was evaporated to dryness.

The residue was dissolved in benzene and purified by column chromatography. The yield was 502 mg. of pure 1α,2α-methylene - 6 - methyl-17α-hydroxy-androsta-4,6-dien-3-one, M.P. 193°–194.5° C.

I.R. (CHCl$_3$): 3615, 1645, 1625, 1580 cm.$^{-1}$.

EXAMPLE VII 469 mg. of 1α,2α-methylene-6-methyl-17α-hydroxy-androsta-4,6-dien-3-one were dissolved in 1.88 ml. of pyridine and 0.94 ml. of acetic anhydride and the solution was set aside at room temperature. After 16 hours the acetylation was complete and the reaction mixture was diluted with water. The product was extracted with methyl isobutyl ketone, the extract washed successively with 5% hydrochloric acid, aqueous sodium bicarbonate and water, and then evaporated to dryness. The residue was chromatographed on a silica gel column yielding 470 mg. of pure 1α,2α-methylene - 6 - methyl-17α-acetoxy-androsta-4,6-dien-3-one as an amorphous solid.

I.R. (CHCl$_3$): 1720, 1646, 1628, 1582, 1370, 1028 cm.$^{-1}$.
M.S.: mol. peak 354.

EXAMPLE VIII a. 3.9 g. of 1α,2α-methylene-6-chloro-17α-acetoxy-androsta-4,6-dien-3-one (prepared according to the procedure of Example III) were dissolved in a freshly prepared solution of 0.8 g. of potassium hydroxide in 80 ml. of methanol. After 16 hours standing at room temperature the reaction was complete. Water was added dropwise whereupon the product crystallized. The crystals were collected, washed with water and dried. The yield was 2.6 g. of pure 1α,2α-methylene-6-chloro-17α-hydroxy-androsta-4,6-dien-3-one, M.P. 205.5–207° C.

I.R. (CHCl$_3$): 3618, 1645, 1605, 1583 cm.$^{-1}$.
M.S.: mol. peak 332.

b. In the same way 1α,2α-methylene-17α-acetoxy-androsta-4,6-dien-3-one (prepared according to the procedure of Example I) was converted to 1α,2α-methylene-17α-hydroxy-androsta-4,6 - dien - 3 - one. This compound proved to be indentical with the product of Example II.

c. In the same way 1α,2α-methylene-17α-acetoxy-androsta-4,6,8(14)trien-3-one (prepared according to the procedure of Example IV) was converted to 1α,2α-methylene-17α-hydroxy-androsta-4,6,8(14)-trien-3-one.

d. In the same way 1α,2α-methylene-6-chloro-17α-acetoxy-androsta-4,6,8(14)-trien-3-one (prepared according to the procedure of Example V) was converted to 1α,2α-methylene-6-chloro-17α-hydroxy - androsta - 4,6,8(14)-trien-3-one. M.P. 228–229.5° C.
I.R. (CHCl$_3$): 3620, 1645, 1586, 1062 cm.$^{-1}$.

e. In the same way 1α,2α-methylene-6-methyl-17α-acetoxy-androsta-4,6-dien-3-one (prepared according to the procedure of Example VII) was converted to 1α,2α-methylene - 6 - methyl-17α-hydroxy-androsta-4,6-dien-3-one. This compound proved to be identical with the product of Example VI.

f. In the same way 1α,2α-methylene-6-bromo-17α-acetoxy-androsta-4,6-dien-3-one (prepared according to the procedure of the following Example XI) was converted to 1α,2α-methylene-6-bromo-17α-hydroxy-androsta-4,6-dien-3-one.

EXAMPLE IX 2 g. of 1α,2α-methylene-6-chloro-17α-hydroxy-androsta-4,6-dien-3-one were dissolved in 20 ml. of pyridine; 2 ml. of propionic anhydride and 100 mg. of p-dimethyl-amino-pyridine were added and the mixture set aside at room temperature. After 1 hour the reaction was complete and the mixture diluted with methyl isobutyl ketone. The solution was washed successively with 6 N sulphuric acid, aqueous potassium carbonate solution and water, and evaporated to dryness. The residue was crystallized from ethanol.

The yield was 2 g. of 1α,2α-methylene-6-chloro-17α-hydroxy-androsta-4,6-dien - 3 - one 17 - propionate, M.P. 159.5°–160° C.

I.R. (CHCl$_3$): 1725, 1650, 1608, 1590, 1171 cm.$^{-1}$.
M.S.: mol. peak 388.

EXAMPLE X

According to the procedure of Example IX the following compounds were prepared:

a. 1α,2α-methylene-6-chloro-17α-hydroxy-androsta-4,6-dien-3-one 17 butyrate, M.P. 164°–165° C.

I.R. (CHCl$_3$): 1720, 1660, 1650, 1609, 1590, 1172 cm.$^{-1}$.
M.S.: mol. peak 402.

b. 1α,2α-methylene-6-chloro-17α-hydroxy-androsta-4,6-dien-3-one 17 valerate, M.P. 95.5°–96° C.

I.R. (CHCl$_3$): 1724, 1650, 1607, 1588, 1170 cm.$^{-1}$.
M.S.: mol. peak: 416.

c. 1α,2α-methylene-6-chloro-17α-hydroxy-androsta-4,6-dien-3-one 17-capronate (oil).

I.R. (CHCl$_3$): 1720, 1650, 1608, 1590, 1167 cm.$^{-1}$.
N.M.R. (CDCl$_3$): 0.85, 0.90, 1.23, 4.88, 6.18, 6.27 p.p.m.
M.S.: mol. peak 430.

d. 1α,2α-methylene-6-chloro-17α-hydroxy-androsta-4,6-dien-3-one 17-palmitate, (oil).

I.R. (CHCl$_3$): 2930, 2859, 1720, 1650, 1605, 1588 cm.$^{-1}$.
N.M.R. (CDCl$_3$): 0.85, 1.25, 3.49, 4.87, 6.17, 6.26 p.p.m.
M.S.: mol. peak 570.

e. 1α,2α-methylene-6-chloro-17α-hydroxy-androsta-4,6-dien-3-one 17-pivalate, M.P. 179°–180° C.

I.R. (CHCl$_3$): 1720, 1650, 1609, 1590, 1160 cm.$^{-1}$.
M.S.: mol. peak 416.

f. 1α,2α-methylene-6-chloro-17α-hydroxy-androsta-4,6-dien-3-one 17-cyclopropyl carboxylate, M.P. 141.5–142.5° C.

I.R. (CHCl$_3$): 1718, 1650, 1607, 1590, 1170 cm.$^{-1}$.
M.S.: mol. peak 400.

g. 1α,2α-methylene-6-chloro-17α-hydroxy-androsta-4,6-dien-3-one 17-cyclohexyl carboxylate, M.P. 126°–127° C.

I.R. (CHCl$_3$): 2940, 2863, 1720, 1650, 1609, 1588, 1170 cm.$^{-1}$.
M.S.: mol. peak 442.

h. 1α-2α-methylene-6-chloro-17α-hydroxy-androsta-4,6-dien-3-one 17-adamantyl carboxylate, M.P. 207.5°–208.5° C.

I.R. (CHCl$_3$): 1712, 1650, 1609, 1590, 1080 cm.$^{-1}$.
M.S.: mol. peak 494.

i. 1α,2α-methylene-6-chloro-17α-hydroxy-androsta-4,6-dien-3-one 17-chloro-acetate, M.P. 174°–177° C.

I.R. (CHCl$_3$): 1732, 1725, 1650, 1608, 1590, 1168 cm.$^{-1}$.
M.S.: mol. peak 408.

j. 1α,2α-methylene-6-chloro-17α-hydroxy-androsta-4,6-dien-3-one 17-(β-phenyl)-propionate, M.P. 212°–213° C.

I.R. (CHCl$_3$): 1725, 1650, 1605, 1588, 1157 cm.$^{-1}$.
M.S.: mol. peak 464.

k. 1α,2α-methylene - 6 - chloro-17α-hydroxy-androsta-4,6-dien-3-one 17-benzoate (oil).

I.R. (CHCl$_3$): 1713, 1652, 1608, 1589, 1280, 1118 cm.$^{-1}$
N.M.R. (CDCl$_3$): 0.93; 1.20, 1.24, 3.47, 5.12, 6.18, 7.1–8.1 p.p.m.
M.S.: mol. peak 436.

l. 1α,2α-methylene - 6 - chloro-17α-hydroxy-androsta-4,6-dien-3-one 17-nicotinate (amorphous solid).

I.R. (CHCl$_3$): 1720, 1650, 1609, 1595, 1125, 1115 cm.$^{-1}$.
N.M.R. (CDCl$_3$): 0.94, 1.24, 5.1, 6.18, 6.28, 7.4, 8.3, 8.8, 9.2 p.p.m.
M.S.: mol. peak 437.

m. 1α,2α-methylene - 6 - chloro-17α-hydroxy-androsta-4,6-dien-3-one 17-isonicotinate, M.P. 182°–184° C.

I.R. (CHCl$_3$): 1722, 1650, 1608, 1590, 1562, 1122 cm.$^{-1}$.
M.S.: mol. peak 437.

EXAMPLE XI a. A mixture of 500 mg. of 1α,2α - methylene - 6α,7α-epoxy-17α-acetoxy-androst-4-en-3-one (prepared according to the procedure of Example III(a)), 500 mg. of phosphorus pentoxide and 10 ml. of chloroform was saturated with hydrogen bromide. The mixture was stirred for 24 hours at room temperature and then washed successively with water, 1 molar aqueous sodium bicarbonate solution and water. The resulting solution was then evaporated to dryness. The residue was dissolved in methylene chloride and chromatographed on a silica gel column. There was obtained 70 mg. of 1α-bromomethyl-6-bromo-17α-acetoxy-androsta-4,6-dien-3-one (oil).

I.R. (CHCl$_3$): 1720, 1648, 1617, 1580, 1375, 1028 cm.$^{-1}$.
M.S.: mol. peak 498–502.

b. 40 mg. of the product of (a) were refluxed for 3 hours in 1 ml. of symm.-collidine. After cooling to room temperature the mixture was diluted with methyl isobutyl ketone and washed with 6 N-sulphuric acid and then with water. The resulting solution was evaporated to dryness, the residue dissolved in methylene chloride and purified by column-chromatography. The yield was 19 mg. of 1α,2α-methylene - 6 - bromo - 17α - acetoxy-androsta-4,6-dien-3-one (semi-crystalline).

I.R. (CHCl$_3$): 1716, 1637, 1618, 1582, 1374, 1026 cm.$^{-1}$.
M.S.: mol. peak 418–420.

EXAMPLE XII a. 1 part of a saturated chloroform solution of hydrogen bromide was diluted with 3 parts of chloroform. To 200 ml. of this solution 5 g. of 1α,2α - methylene-6α,7α-epoxy - 17α - acetoxy-androst-4-en-3-one were added and the obtained solution was stirred at room temperature. After 10 minutes the reaction was complete and the solution was washed with 50 ml. of a 1 molar aqueous solution of sodium bicarbonate and water. The solution was then concentrated to a small volume and the product was precipitated by the addition of diethyl ether. The crystalline precipitate was filtered off, washed with diethyl ether and dried. The yield was 5.4 g. of 1α,2α-methylene-6β - bromo - 7α - hydroxy - 17α - acetoxy - androst-4-en-3-one, M.P. 223°–226° C.

I.R. (CHCl$_3$): 3610, 1728, 1665, 1642, 1392, 1034 cm.$^{-1}$.
M.S.: mol. peak 434–438.

b. To a solution of 250 mg. of the product of (a) in 2 ml. of anhydrous pyridine, 0.2 ml. of mesyl chloride were added and the mixture was set aside at room temperature. After 5 hours the reaction mixture was poured into water and extracted with methyl isobutyl ketone. The extract was washed with water and evaporated to dryness. The residue was dissolved in methylene chloride and purified by column chromatography. The yield was 121 mg. of 1α,2α - methylene - 6β - bromo - 7α - mesyloxy - 17α-acetoxy-androst-4-en-3-one, M.P. 184°–185° C.

I.R. (CHCl$_3$): 1722, 1670, 1635, 1388, 1368, 1183, 1034 cm.$^{-1}$.
M.S.: mol. peak 514–516.

c. 50 mg. of the product of (b) were refluxed in 0.5 ml. of symm.-collidine. After 15 minutes the reaction mixture was cooled to room temperature and diluted with methyl isobutyl ketone. The solution was washed with 6 N sulphuric acid and water and then evaporated to dryness. The residue was dissolved in methylene chloride and purified by column chromatography. The yield was 17 mg. of 1α,2α-methylene - 6 - bromo - 17α - acetoxy-androsta-4,6-dien-3-one (oil), chromatographically identical to the product of Example XIb.

The present invention also includes within its scope pharmaceutical compositions which comprise at least one compound of general formula I and a pharmaceutically acceptable carrier or diluent.

The compositions may take any of the forms customarily employed for administration of therapeutically active substances, but the preferred types are those suitable for oral administration, especially tablets, including sustained release tablets, pills and capsules, and those suitable for local or parenteral administration. The tablets and pills may be formulated in the usual manner with one or more pharmaceutically acceptable diluents or excipients, and can include lubricants. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations.

The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

The active substance may also be made up in creams, ointments and lotions suitable for local application. These preparations may be formulated in the usual manner with one or more pharmaceutically acceptable diluents or excipients.

When used for local application the concentration of the active compound of formula I in the creams, ointments and lotions may vary between 0.01% and 1%. For oral use, in the form of tablets for example, each tablet may contain from 0.5 mg. to 50 mg. of the active substance. Suitable daily dosages for humans consist of 1 to 5 tablets. When used for parenteral administration, for example suspensions for intramuscular administration or solutions for intravenous administration, concentrations may vary from 5 to 50 mg./ml., while the daily dosage in human application will vary from 1 to 5 ml.

For use in the veterinary field the concentration of the active substance in injectable preparations (suspensions as well as solutions) may vary from 1 to 10 mg./ml. The daily dosages will vary from 1 to 15 ml.

A tablet suitable for oral administration can be prepared from the following ingredients:

| | Mg. |
|---|---|
| 1α,2α - methylene-6-methyl - 17α - hydroxy-androsta-4,6-dien-3-one 17α-propionate (micronized) | 50 |
| Polyvinylpyrrolidone | 4 |
| Corn starch | 100 |
| Magnesium stearate | 0.4 |
| Lactose | Ad 200 |

A suitable cream for local application may be made from the following ingredients:

| | G. |
|---|---|
| 1α,2α - methylene - 6 - chloro-17α-hydroxy-androsta-4,6-dien-3-one 17-butyrate | 0.5 |
| Cetostearyl alcohol | 7.2 |
| Polyoxyethylene cetyl ether | 1.8 |
| Liquid paraffin | 6 |
| Vaseline | 15 |
| Methyl paraben | 0.2 |
| Water | Ad 100 |

A suitable ointment for local application may consist of, for example:

| | |
|---|---|
| 1α,2α - methylene - 6 - chloro-17α-hydroxy-androsta-4,6-diene-3-one 17-acetate | 0.5 |
| Liquid paraffin | 10 |
| Lanoline | 10 |
| Vaseline | Ad 100 |

An injectable preparation can consist of, for example:

| | | |
|---|---|---|
| 1α,2α - methylene - 6 - chloro-17α-hydroxy-androsta-4,6-dien-3-one | mg | 25 |
| Benzyl alcohol | ml | 0.1 |
| Maize oil | ml | Ad 1 |

In the claims:

1. 1α,2α-methylene-androstane derivatives of the general formula I

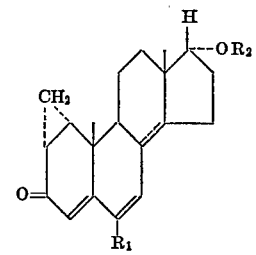

in which the dotted line between the 8- and 14-positions indicates the optional presence of a double bond, and wherein $R_1$ represents a hydrogen or a halogen atom or a methyl group, and $R_2$ represents a hydrogen atom or an acyl group derived from an organic carboxylic acid of the general formula $R_3$—COOH, wherein $R_3$ represents a straight or branched chain aliphatic hydrocarbon group having less than 16 carbon atoms and which may be substituted by a halogen atom or a phenyl group, or $R_3$ represents a cycloalkyl group having 3 to 6 carbon atoms, a phenyl, adamantyl or pyridyl group.

2. 1α,2α-methylene-androstane derivatives according to claim 1, wherein $R_1$ represents a chlorine or bromine atom.

3. 1α,2α-methylene-androstane derivatives according to claim 1 wherein $R_2$ represents an acyl group derived from an organic carboxylic acid of the general formula $R'_3$—COOH, wherein $R'_3$ represents a straight or branched chain aliphatic hydrocarbon group having less than 6 carbon atoms which may be substituted by a chlorine atom or a phenyl group, or $R'_3$ represents a cyclopropyl, phenyl or pyridyl group.

4. 1α,2α-methylene-androstane derivatives according to claim 1 wherein $R_2$ represents a hydrogen atom.

5. 1α,2α-methylene-androstane derivatives according to claim 1 wherein $R_3$ represents a methyl, ethyl, propyl, butyl, pentyl, chloromethyl, (β-phenyl)-ethyl or (α,α-dimethyl)ethyl group.

6. The androstane derivative according to claim 1, 1α,2α-methylene-17α-acetoxy-androsta-4,6-dien-3-one.

7. The androstane derivative according to claim 1, 1α,2α-methylene-17α-hydroxy-androsta-4,6-dien-3-one.

8. The androstane derivative according to claim 1, 1α,2α-methylene - 6 - chloro - 17α - acetoxy androsta-4,6-dien-3-one.

9. The androstane derivative according to claim 1, 1α,2α-methylene - 17α - acetoxy-androsta-4,6,8(14)-trien-3-one.

10. The androstane derivative according to claim 1, 1α,2α - methylene - 6 - chloro - 17α - acetoxy-androsta-4,6,8(14)-trien-3-one.

11. The androstane derivative according to claim 1, 1α,2α-methylene - 6 - methyl-17α-hydroxy-androsta-4,6-dien-3-one.

12. The androstane derivative according to claim 1, 1α,2α-methylene - 6 - methyl - 17α - acetoxy-androsta-4,6-diene-3-one.

13. The androstane derivative according to claim 1, 1α,2α-methylene - 6 - chloro - 17α - hydroxy-androsta-4,6-dien-3-one.

14. The androstane derivative according to claim 1, 1α,2α-methylene - 17α - hydroxy-androsta-4,6,8(14)-trien-3-one.

15. The androstane derivative according to claim 1, 1α,2α - methylene - 6 - chloro - 17α - hydroxy-androsta-4,6,8(14)-trien-3-one.

16. The androstane derivative according to claim 1, 1α,2α - methylene - 6 - bromo - 17α - hydroxy-androsta-4,6-diene-3-one.

17. The androstane derivative according to claim 1, 1α,2α - methylene - 6 - chloro - 17α - hydroxy-androsta-4,6-diene-3-one 17-propionate.

18. The androstane derivative according to claim 1, 1α,2α-methylene - 6 - chloro - 17α - hydroxy-androsta-4,6-dien-3-one 17-butyrate.

19. The androstane derivative according to claim 1, 1α,2α-methylene - 6 - chloro - 17α - hydroxy-androsta-4,6-dien-3-one 17-valerate.

20. The androstane derivative according to claim 1, 1α,2α-methylene - 6 - chloro - 17α - hydroxy-androsta-4,6-dien-3-one 17-capronate.

21. The androstane derivative according to claim 1, 1α,2α-methylene - 6 - chloro - 17α - hydroxy-androsta-4,6-dien-3-one 17-palmitate.

22. The androstane derivative according to claim 1, 1α,2α-methylene - 6 -chloro - 17α - hydroxy-androsta-4,6-dien-3-one 17-pivalate.

23. The androstane derivative according to claim 1, 1α,2α-methylene - 6 - chloro - 17α - hydroxy-androsta-4,6-dien-3-one 17-cyclopropyl carboxylate.

24. The androstane derivative according to claim 1, 1α,2α-methylene - 6 - chloro - 17α - hydroxy-androsta-4,6-dien-3-one 17-cyclohexyl carboxylate.

25. The androstane derivative according to claim 1, 1α,2α-methylene - 6 - chloro - 17α - hydroxy-androsta-4,6-dien-3-one-17-adamantyl carboxylate.

26. The androstane derivative according to claim 1, 1α,2α-methylene - 6 - chloro - 17α - hydroxy-androsta-4,6-dien-3-one 17-chloroacetate.

27. The androstane derivative according to claim 1, 1α,2α-methylene - 6 - chloro - 17α - hydroxy-androsta-4,6-dien-3-one 17(β-phenyl)-propionate.

28. The androstane derivative according to claim 1, 1α,2α-methylene - 6 - chloro - 17α - hydroxy-androsta-4,6-dien-3-one 17-benzoate.

29. The androstane derivative according to claim 1, 1α,2α-methylene - 6 - chloro - 17α - hydroxy-androsta-4,6-dien-3-one 17-isonicotinate.

30. The androstane derivative according to claim 1, 1α,2α-methylene - 6 - chloro - 17α - hydroxy-androsta-4,6-dien-3-one 17-nicotinate.

31. The androstane derivative according to claim 1, 1α,2α-methylene - 6 - bromo - 17α - acetoxy-androsta-4,6-dien-3-one.

References Cited
UNITED STATES PATENTS

| | | | |
|---|---|---|---|
| 3,127,396 | 3/1964 | Wiechert et al. | 260—239.5 |
| 3,338,893 | 8/1967 | Beard et al. | 260—239.55 |
| 3,365,445 | 1/1968 | Wiechert et al. | 260—239.55 |

HENRY A. FRENCH, Primary Examiner

U.S. Cl. X.R.

260—397.4, 397.45; 424—241, 243